Sept. 10, 1968

W. L. NELSON 3,401,041

PACKAGING AND SHAPING APPARATUS AND METHOD
FOR CHEESE PRODUCTS

Filed June 22, 1964

INVENTOR.
WILFRID L. NELSON
BY John H. Widdowson
ATTORNEY

Sept. 10, 1968 W. L. NELSON 3,401,041
PACKAGING AND SHAPING APPARATUS AND METHOD
FOR CHEESE PRODUCTS
Filed June 22, 1964 4 Sheets-Sheet 3

INVENTOR.
WILFRID L. NELSON
BY
John H. Widdowson
ATTORNEY

Sept. 10, 1968  W. L. NELSON  3,401,041
PACKAGING AND SHAPING APPARATUS AND METHOD
FOR CHEESE PRODUCTS
Filed June 22, 1964  4 Sheets-Sheet 4

INVENTOR.
WILFRID L. NELSON
BY
John H. Widdowson
ATTORNEY 3,401,041
PACKAGING AND SHAPING APPARATUS AND
METHOD FOR CHEESE PRODUCTS
Wilfrid L. Nelson, Tescott, Kans. 67484
Filed June 22, 1964, Ser. No. 376,915
6 Claims. (Cl. 99—115)

ABSTRACT OF THE DISCLOSURE

This invention is a packaging and shaping apparatus and method to receive, package, press, and shape of curd used in manufacturing cheese and the like. More specifically, this invention is an apparatus for packaging material having a hopper member connected to a housing and having an auger therein; a carriage mountable about the auger adapted to receive material therefrom; and fluid means operable to maintain a biasing force against movement of the carriage on receiving the material so as to form the same into a pre-determined shape under uniform pressure. Also, this invention is a method for processing cheese by forcing material from a housing into a container which is mounted in telescoping and movable relationship to the housing and simultaneously maintaining a pressure against the resultant merging material.

The manufacture of cheese has become a major activity in many dairy processing plants. It has been one of the last branches of the dairy industry to become well mechanized. There is a growing appreciation in the manufacture of cheese for the need of the same sanitary precautions used in other branches of the dairy industry.

In the usual method of manufacturing cheese, sweet milk and/or skim milk is placed in large vats called cheese vats, the milk generally acidified by the addition of lactic acid bacteria, and the curd or casing coagulated by a soluble ferment called rennet. The cheese is then separated from the whey which consists of water, milk, sugar and a little fat and minerals. The whey is then drained from the cheese vat leaving the cheese curd. The curd in the cheese vat is then cut into small pieces, preferably with a cheese curd mill. At this stage the curd is ready to be packed into a mold. The usual method of manufacturing longhorn cheese consists of packing the curd into a mold by hand or fist pressure. The molds, or hoops as they are more commonly referred to in the art, are especially provided for this purpose. These molds or hoops are approximately 14 inches long, 6 inches in diameter at the top, and tapered to 5½ inches at the bottom. The hoops or molds are first lined with a cloth or paper bandage. When the cheese curd is ready it is packed into the mold by hand or fist pressure. After the hoops or molds are filled, they are placed in the hydraulic press for approximately thirty minutes. At the end of this time the presses are released and the cheese dressed down, which consists of pulling the bandage up, replacing the followers, and again repressing for a period of 10 to 12 hours. The cheese is then knocked out of the horns and the bandage removed. The cheese is packed in a plastic film or otherwise acceptable packaging means.

The aforedescribed method of packaging cheese is both laborious and tedious. The method of operation is largely a hand operation which is quite expensive as a result of present relatively high wages. Further the hand operations described hereinbefore is not as sanitary as desired. Even though the workmen's hands may be clean, the entire operation when viewed or discused by the general public may create the impression of unwholesomeness. Further, the cheese when packed in the horns or molds by hand is frequently not uniformly packed. This results in voids and in general nonuniform density. This has disadvantages when determining the weight of cheese when wrapping and selling same.

I have invented a new processing apparatus for cheese. The processing apparatus of my invention has a housing with an inlet opening and an outlet opening therein. An auger is mounted in the housing. A power means is provided to actuate the auger. An abutment means is provided adjacent the outlet opening of the housing and they move relative one another, and a means is connected to same to control relative movement therebetween.

The new method of processing cheese of my invention involves forcing the curd from a housing into a container that is mounted in telescoping and movable relation to the housing. Simultaneously, a back pressure is maintained against the resultant emerging cheese.

The processing apparatus and method of my invention solves problems associated with known processes and apparatus for processing cheese. The new apparatus and method of processing cheese of my invention eliminate the tedious and difficult work conventionally done in processing cheese by hand. The apparatus and method of my invention provide a very efficient apparatus and method of converting cheese curd into convenient commercially acceptable forms of cheese. The operation is performed by my apparatus and method with a minimum of human labor and in a relatively short time. Further, the apparatus and method of my invention eliminate the handling of cheese by employees and workmen, thereby making possible the maintenance of higher standards of sanitation.

Still another advantage of the processing apparatus and method of my invention is that cheese is packed very uniformly. This is so because the container receiving the cheese is biased against the outlet opening at a constant uniform pressure. The cheese emerging from the housing is therefore deposited in the container at a uniform density. This factor makes possible a very uniform length of cheese which can be accurately divided into portions of the desired weights.

An object of my invention is to provide a new processing apparatus for cheese.

Another object of my invention is to provide a new packing and pressing apparatus for handling cheese curd.

Still another object of my invention is to provide a new apparatus that eliminates the laborious and tedious operations conventionally performed in packaging cheese.

Yet another object of my invention is to provide a cheese processing apparatus which eliminates handling the cheese curd and thereby makes possible the maintenance of higher standards of sanitation.

Still another object of my invention is to provide a cheese processing apparatus that is adapted to package cheese into units having a uniform density.

Another object of my invention is to provide a new method for processing cheese.

Still another object of my invention is to provide a new method of packing and pressing cheese curd.

Yet another object of my invention is to provide a new method for processing cheese that eliminates much of the difficult and tedious work conventionally done to process cheese curd.

Another object of my invention is to provide a new method which will eliminate handling of the cheese curd, and thereby make possible the maintenance of higher standards of sanitation.

Another object of my invention is to provide a new method for packing cheese into units having a uniform density throughout.

Other objects and advantages of the new processing apparatus and method of my invention will become apparent to those skilled in the art from reading the disclosure. Drawings accompanying and are a part of this disclosure. These drawings depict preferred specific embodiments of the new processing apparatus and method of my invention, and it is to be understood that such drawings are not to unduly limit the scope of my invention. In the drawings, FIG. 1 is a perspective view of a preferred specific embodiment of my cheese processing apparatus.

Figure 1:
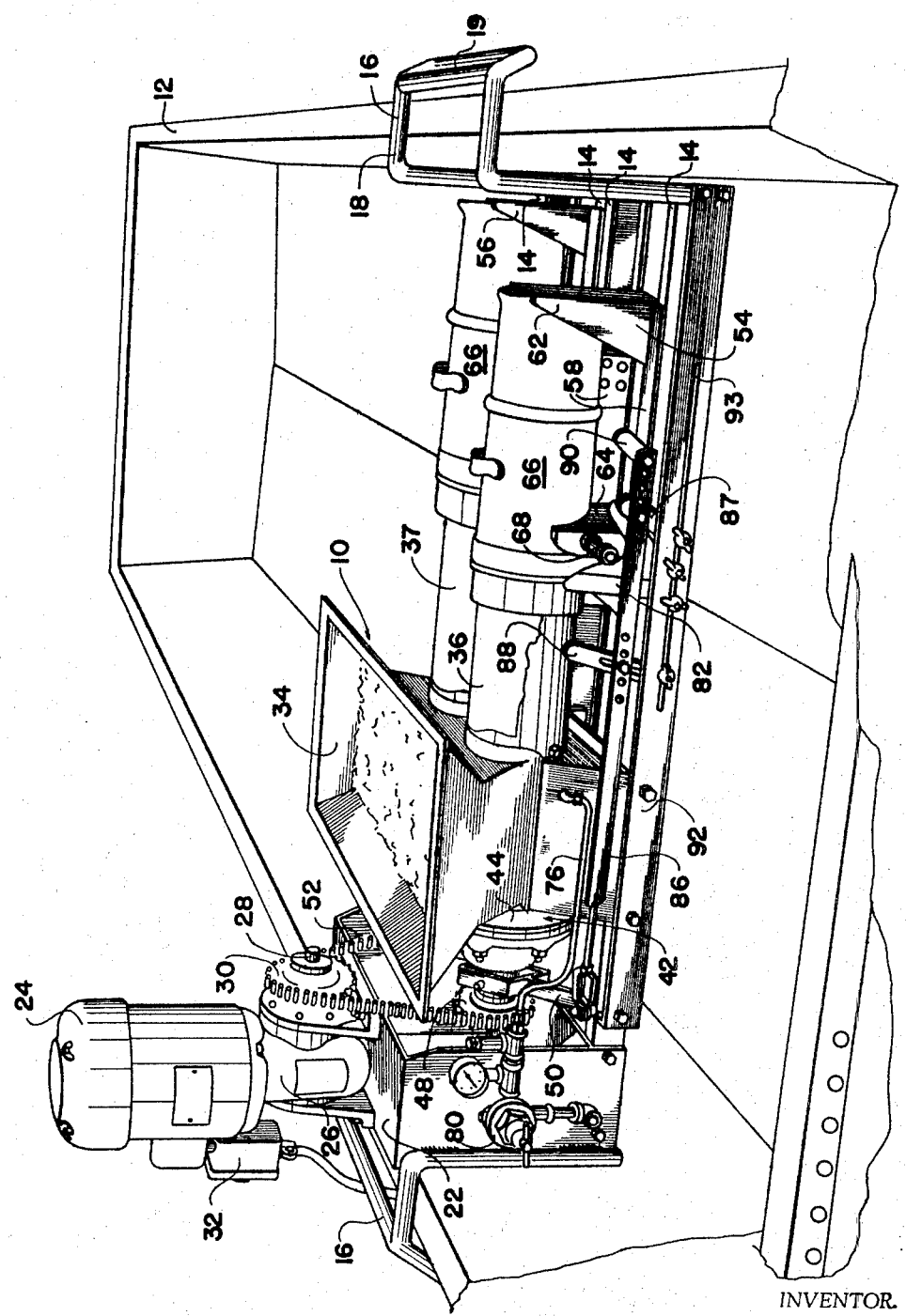

The following is a discussion and description of the processing apparatus and method of my invention made with reference to the drawings, wherein the same reference numerals are used to indicate the same or similar parts and/or structure. The discussion and description is of preferred specific embodiments of the processing apparatus and method of my invention and it is to be understood that such is not limit the scope of my invention.

Referring now to the drawings, in FIG. 1 there is illustrated a preferred specific embodiment 10 of the cheese processing apparatus of my invention. The apparatus 10 of my invention is adapted to be movably mounted on a cheese vat 12 and shape curd into cheese. The apparatus 10 has a frame having four horizontal longitudinally extending elongated channel members 14 arranged to substantially span the width of cheese vat 12. The members 14 have preferably a U-shaped cross section. The frame also includes a hanger means 16 which consists of spaced and inverted L-shaped members 18 with cross members 19 securing members 18 in rigid spaced relationship. As indicated in FIG. 1 the hanger means 16 engages the top edge of the vat 12. The hanger means 16 are positioned on each end of the elongated members 14. An elevated horizontal platform 22 is provided on one end of the frame and is secured to the horizontal members 14 and the hanger means 16. A power source is mounted on platform 22. The power source includes an electric motor 24, a gear reduction box 26 operatively connected to motor 24, which gear reduction box has a horizontal output shaft 28 having a chain sprocket 30 mounted thereon. The gear reduction box 26 can be of any suitable type. I have found that a screw and worm gear arrangement works very well and provides a sufficiently low rotational velocity at shaft 28. A switch 32 can be provided in a convenient position to control the operation of motor 24.

Figure 2:
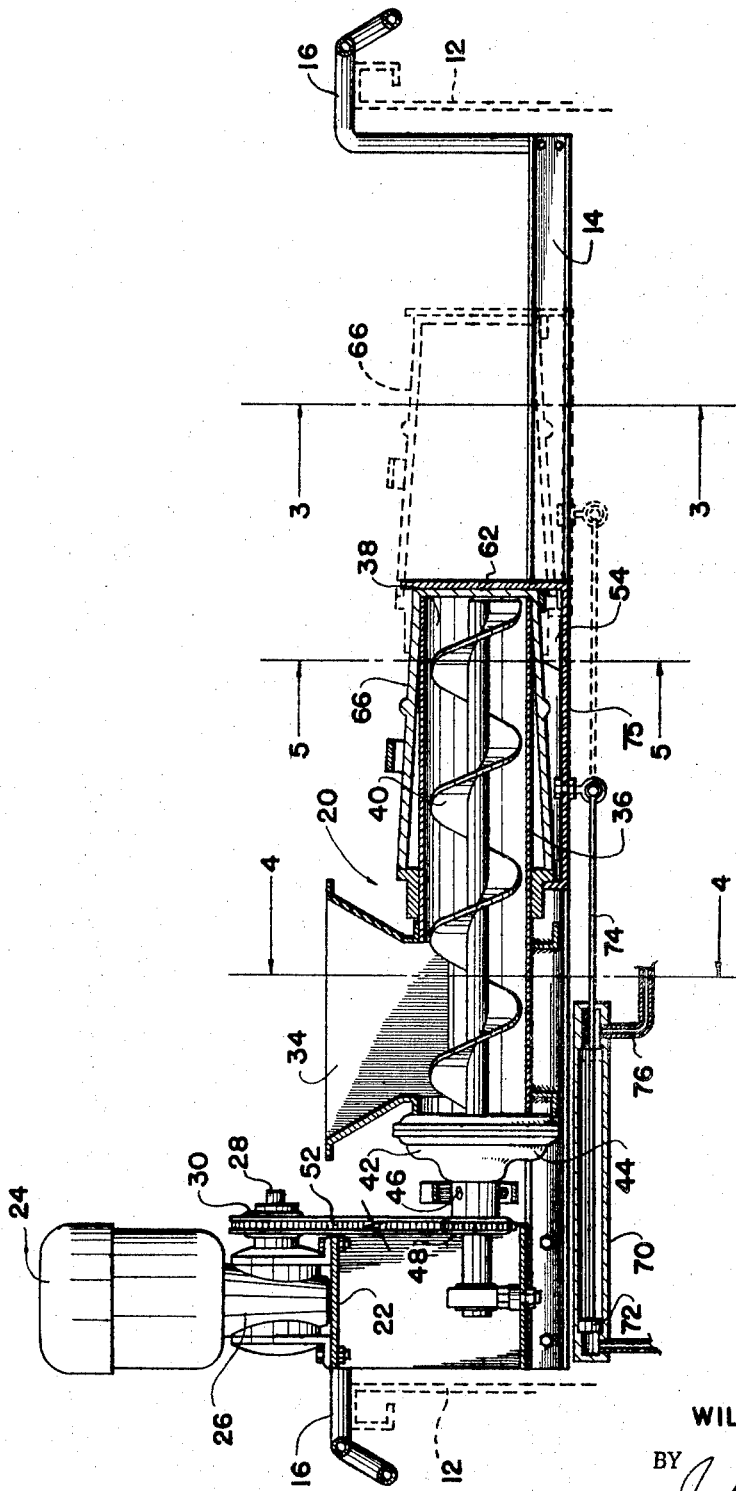
FIG. 2 is a side elevational view in partial cross section of another preferred specific embodiment of my invention.
Figure 3:
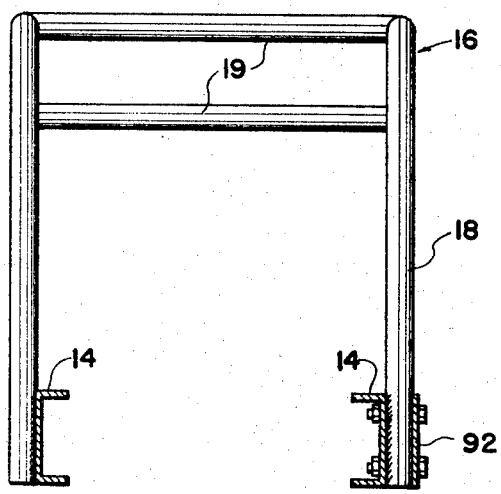
FIG. 3 is a sectional view taken on line 3—3 of FIG. 2.
Figure 4:
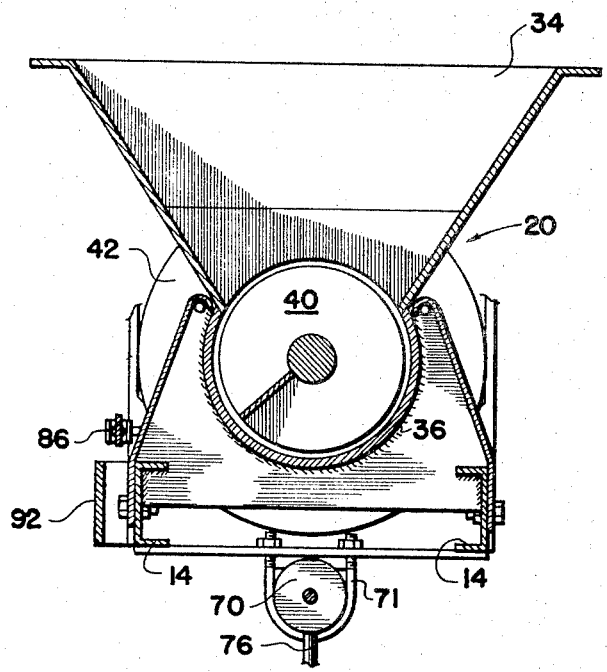
FIG. 4 is a sectional view taken on line 4—4 of FIG. 2.

In FIG. 2 is illustrated another preferred specific embodiment 20 that is quite similar to the embodiment 10 shown in FIG. 1. Embodiment 20 has a single tubular housing portion 36 and a single carriage as will be explained. The following specific description of elements, etc. apply to both embodiments of the invention.

Figure 5:
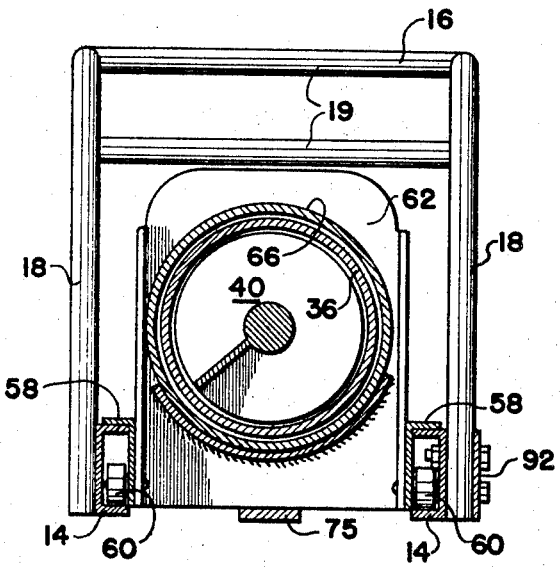
FIG. 5 is a sectional view taken on line 5—5 of FIG. 2.
Figure 6:
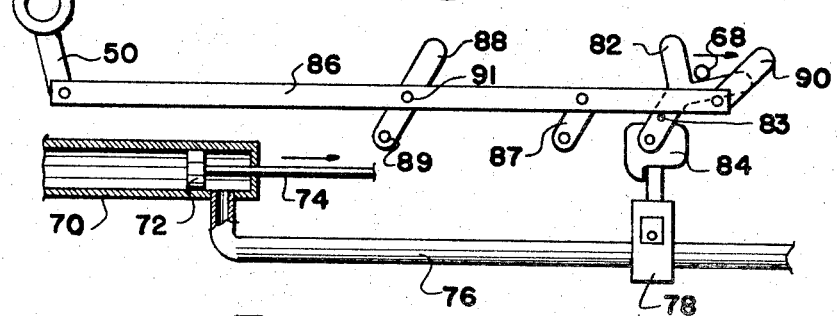
FIG. 6 is a diagrammatic sketch of the automated controls of my invention depicted in position when the carriage is retracted.
Figure 7:
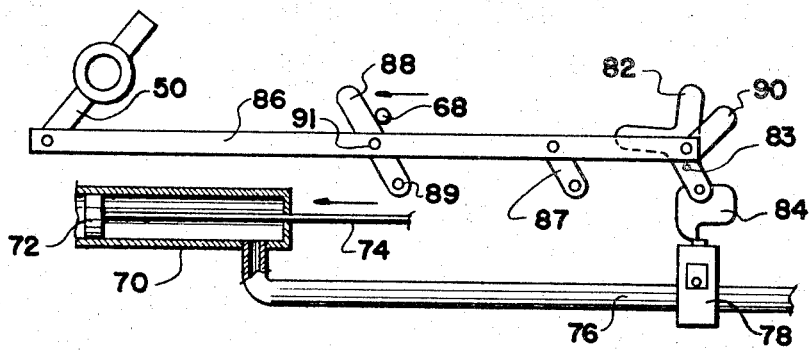
FIG. 7 is a diagrammatic sketch of a preferred embodiment of the control means of my invention shown in a position when the carriage is advanced.

A cheese packing apparatus is mounted on the elongated members 14 of the frame. The cheese packing apparatus has a housing with a hopper portion 34, and two spaced parallel cylindrical portions 36 and 37 connected thereto. The cylindrical portions 36 and 37 have open ends 38, as shown more clearly in FIG. 2. Two augers 40 are rotatably mounted in each cylindrical portion of the housing and also extend into the hopper portion 34. The auger 40 has flights having a pitch of preferably six inches. A clutch means 42 is operatively associated with each of the augers 40 mounted in the housing. Each of the clutch means 42 has an enclosure housing 44, a power input shaft 46 having a chain sprocket mounted thereon. A clutch level 50 is provided for controlling engagement and disengagement of the clutch means. The clutch means can be of any suitable type that is adapted to selectively transmit torque between the chain sprocket 48 and the auger 40. I have found that a conventional disc or plate clutch and/or jaw clutch works very well. An endless chain 52 is mounted on chain sprocket 30 of the gear reduction box 26 and sprockets 48 mounted on the respective clutch means associated with augers 40. If desired other suitable means can be provided to rotate the auger, as for example single electric motors having a low shaft rotational velocity coupled directly to the individual augers. As indicated in FIG. 1 the cylindrical portions 36 and 37 of the housing are mounted on the frame in a position to extend parallel to the members 14 and in spaced relation with the open end 38 facing the end opposite platform 22. Two carriages 54 and 56 are mounted for longitudinal movement on the frame. The carriages 54 and 56 are associated with the respective cylindrical portions 36 and 37 of the housing. The carriages each have a base 58 positioned in rolling engagement with the members 14 of the frame. Preferably the base consists of two spaced lengths of channel iron and a suitable cross bar. The base 58 is provided with rollers 60 as indicated in FIG. 5 of the drawings. A flat upright transverse abutment 62 is provided on end of base 58. An upright yoke member 64 is provided on the opposite end of base 58. As indicated in FIG. 1 the abutment 62 and yoke 64 are adapted to support a hoop or mold 66. The carriage can be modified if desired to accept any suitable size mold. The carriage is also provided with a horizontal transversely protruding trip element 68 mounted on yoke member 64. A means is operatively associated with each of the carriages 54 and 56 to maintain a constant horizontal longitudinal force in operation, which holds the molds 66 against the ends of the tubular portions 36 and 37 of the housing. This means to maintain a constant force has a longitudinally extending cylinder 70 mounted on and beneath the respective members 14 of the frame. This relationship is most clearly shown in FIG. 2 of the drawings. The cylinder can be mounted on the front in any suitable manner, as for example with a clamp 71. A piston 72 is provided in cylinder 70 as illustrated in FIG. 2. piston rod 74 is connected at one end to piston 72 and at the other end to the carriage. Any suitable type of means can be provided to connect the piston rod 74 to the carriage. As shown in FIG. 2 a longitudinally extending bar 75 is shown mounted on the front and rear portions of the base 58. A source of air under pressure (not shown) is provided. A conduit 76 is connected to the cylinder 70 and the source of air. A control valve 78 is provided in conduit 76. This relationship is diagrammatically shown in FIGS. 6 and 7 of the drawings. A pressure release valve 80 is in communication with the conduit 76. On the specific embodiments shown in FIG. 1 the pressure release valve is shown mounted on the side of platform 22. However this pressure release valve could be mounted in any suitable location or embodied in the source of pressure if desired. As best shown in FIGS. 6 and 7 of the drawings a Y-shaped lever 82 is pivotally mounted on the frame in a position so that the trip element 68 on the carriage 54 will contact the arms of the lever to pivot same. A suitable cam means 84 is mounted on the end of lever 82 and is positioned to selectively open and close the control valve 78. Lever 82 is pivotally mounted at point 83 as shown in FIGS. 6 and 7. It can be seen that as the carriage 54 moves back and forth the trip element 68 will engage the arms of lever 82 and move the cam means 84. Movement of cam means 84 will open or close valve 78. FIG. 6 shows the position of the lever 82 when the carriage is completely retracted. The trip element 68 moves lever 82 in the position shown which in turn moves the cam 84 to close valve 78. When the carriage is moved forwardly the trip element 68 engages the other arm of lever 82 to move cam 84 and open valve 78, as shown in FIG. 7. In embodiment 10, shown in FIG. 1, a cylinder 70, lever 82, and control valve 78 will be provided for each cylinder portion of the housing and carriage. In the embodiment 20, shown in FIG. 2, only one cylinder, lever, and control valve will be provided.

A means is provided to correlate movement of the carriage and the respective auger in the housing. The means to correlate the auger and carriage has a movable elongated bar 86 connected at one end to the clutch lever 50 and supported on the opposite end with a pivotal link 87. A lever 88 is pivotally mounted on the lower end at 89 in a fixed position relative to the member 14 of the frame, and pivotally connected to the bar 86 in the center portion at 91. The lever 88 is positioned to engage the trip element 68 mounted on carriage 54. When as indicated in FIG. 7 the forward movement of trip element 68 forces lever element 88 in a forward direction and thereby moves clutch lever 50. Movement of the clutch lever to the position shown in FIG. 7 causes engagement of the clutch and subsequent rotation of the auger 40. A second abutment means 90 is provided on bar 86. This abutment means 90 is positioned on bar 86 so that when trip element 68 on the carriage 54 strikes same it moves bar 86 and clutch lever 50 to disengage the clutch. This position of the clutch lever 50 is shown in FIG. 6 of the drawings. Preferably the levers 82 and 88 and the link 87 are mounted separately from the elongated members 14 of the frame. As shown in FIG. 1, these levers and link are mounted on a bar or elongated member 92 secured in spaced relation to member 14. The bolts securing the various levers and pivotal elements can be mounted in a slot 93 as indicated. Also a plurality of apertures can be provided in bar 86 to provide a convenient means for adjusting the relative positions of the levers and link members in the control means of my invention. In the embodiment 10, two separate means to correlate the movement of the auger and carriage are provided. A means is associated with each carriage and auger. If desired other suitable mechanism can be provided to correlate the operation of the carriage and auger, as for example solenoid switches, hydraulic actuating elements, other arrangements of levers, etc.

In operation the cheese processing apparatus 10 of my invention can be mounted on a vat 12 as indicated in FIG. 1. The cheese curd is preferably cut into relatively small pieces and piled along one side of the vat, preferably the side adjacent the hopper of apparatus 10. The cheese curd is then deposited in the hopper 34 where it is forced out of the tubular portions of the housing 36 and 37 into hoops or molds 66. A hoop or mold in maintained against each end of the tubular housings 36 and 37 and the emerging cheese under a constant opposing pressure. In using the embodiment shown in FIG. 1, having two separate tubular housings and carriages, a continuous operation can be performed. As one hoop or mold is filled the other is being taken out and an empty hoop replaced. For example, the hopper 34 is filled with cheese curd and two hoops on the carriages 54 and 56. Carriage 54 is moved forwardly by hand which forward movement will cause movement of the lever 82 and the opening of valve 78. When valve 78 is open, air will be admitted to cylinder 70 and force the cylinder forwardly. When the carriage 54 reaches its forward position the trip element 68 will engage the lever 88 to engage the clutch causing rotation of the auger in cylindrical housing portion 36. Cheese will then be forced out of the tubular housing 36 into the hoop 66. Preferably a bandage consisting of a damp muslin cloth or the like is first draped around the tubular housing 36. As the cheese is forced out of the housing, it will be forced into the bandage and also into the mold or hoop 66. As the hoop 66 is filled it will be forced back against the pressure exerted by the cylinder 70. When the hoop is filled, the trip element 68 will engage lever 82 and abutment 90 to close valve 78 and disengage the clutch driving the auger. At this point the operator can move carriage 56 forwardly to open valve 78 and cause subsequent engagement of the clutch. The cheese will then be forced from the hopper through cylindrical portion 37 into the hoop or mold 66 deposited on carriage 56. During the time this hoop is being filled, the hoop 66 can be removed from carriage 54, another bandage applied on the housing portion 36, and a new hoop placed on carriage 54.

If desired the processing apparatus of my invention can be provided with a single cylindrical portion 36 and a single carriage. This preferred specific embodiment 20 is depicted in FIGS. 2–5. The construction of the auger, clutch, power means, etc. is basically the same as described in connection with the preferred specific embodiment 10 depicted in FIG. 1.

The new method of my invention of shaping and packing cheese embodies cutting cheese curd in a cheese vat into relatively small sized pieces, and subsequently forcing the pieces of curd through an elongated cylindrical housing out of an open end. The curd as it is forced from the open end of the housing is received in a damp cloth bandage slidably disposed over the elongated housing. Simultaneously the resultant bandage and packed cheese is received in a hoop or mold. Preferably the mold is six inches in diameter and approximately five foot in length. The mold is telescopingly disclosed over the elongated housing during the filling thereof. Any suitable size mold can be used. During the filling of the mold a constant back pressure is maintained against the resultant cheese emerging from the housing. I found that it takes approximately ten to twelve seconds to fill one mold or hoop with my new processing apparatus. The tubes or hoops of cheese are then put into a press and pressed for a suitable length of time, preferably about thirty minutes. The tubes containing the cheese are then placed in a cooler or drying room. The cheese can then be taken from the tubes or hoops, the bandage removed and the cheese cut into suitable lengths. The resultant lengths of cheese are then placed in a plastic film or otherwise suitable covering and are ready to be marketed.

As will be obvious to those skilled in the art, various changes and modifications of the preferred processing apparatus and method of my invention as described herein can be made or followed without departing from the spirit of the disclosure or the scope of the claims.

I claim:

1. An apparatus for movably mounting on a cheese vat comprising, a frame having spaced longitudinally horizontal members, a platform on a first end of said frame, a power source mounted on said platform, a cheese packing apparatus mounted on said frame comprising, a housing having a hopper portion and a tubular portion having an open end, an auger rotatably mounted in said housing, a clutch means having a power input shaft, a clutch lever for controlling engagement and disengagement of said clutch means, said clutch means to selectively transmit torque between said input shaft and said auger, a carriage mounted on said frame having a base, roller means mounted on said base positioned in rolling engagement with said members of said frame, a trip element on said carriage, a fluid means to maintain a constant force on said carriage, said fluid means having a piston and cylinder mounted on said frame, said piston and cylinder having a piston rod connected to said carriage, a source of air under pressure, a conduit connecting said cylinder to said source of air, a control valve in said conduit, a pressure release valve in communication with said conduit, a first lever positioned to selectively engage said trip element pivotally mounted on said frame, means associated with said first lever positioned to selectively open and close said control valve in said conduit when said first lever is pivoted, a means to correlate movement of said carriage and said auger comprising, a movable bar connected at one end to said clutch lever, a second lever connected to said bar, said second lever positioned to engage said trip element on said carriage and be actuated by same, said apparatus adapted when in use to be mounted on a cheese vat, receive curd in the hopper of said housing, force the curd out of said housing through said cylindrical portion into a container mounted on the yoke and abutment of said carriage, which carriage is maintained under constant opposing pressure, and fill the container with the cheese.

2. An apparatus for packing cheese comprising, a frame having longitudinally extending members, a support means for said members, a platform on said frame secured to said members, a power source mounted on said platform, a cheese packing apparatus mounted on said frame comprising, a housing having a tubular portion with an open end and a hopper portion, an auger rotatably mounted in said housing, a clutch means operatively associated with said auger having a lever for controlling engagement and disengagement of said clutch means, and a carriage mounted on said frame adjacent said tubular portion of said housing having a base, roller means on said base positioned in rolling engagement with said members of said frame, a transverse abutment on one end of said base, and a protruding trip element on said carriage, a means to maintain a constant longitudinal force on said carriage, said means having a longitudinally extending cylinder, a piston in said cylinder, a piston rod connected in one end to said piston and the other end connected to said carriage, a source of fluid under pressure, a conduit connecting said cylinder to said source of fluid, a control valve in said conduit, a lever on said frame in a position to selectively engage said trip element on said carriage, connecting means between said first lever and said control valve adapting said first lever to open and close said control valve, a means to correlate the movement of said carriage and said auger, comprising, a bar connected at one end to said clutch lever, protruding means connected to said bar to selectively engage said trip element on said carriage, said apparatus adapted when in use to receive curd in the hopper of said housing, force the curd out of said housing into a tubular container mounted on said carriage, and fill the tubular container with cheese.

3. An apparatus for packing cheese comprising, a housing having a tubular portion with an open end and a hopper portion, an auger rotatably mounted in said housing, a clutch means operatively associated with said auger, a driving means operatively connected to said clutch means, a carriage mounted for movement along the longitudinal axis of said tubular portion of said housing having a base, roller means supporting said base, a transverse abutment means on said base, and a trip element, a means to maintain a constant longitudinal force on said carriage toward said housing comprising, a piston and cylinder connected to said housing and said carriage, control means for said cylinder adapted to actuate same when said carriage is at a predetermined position relative to said housing, a means to correlate the movement of said carriage and said auger having elongated means operatively connected to said clutch to engage and disengage same, and means on said bar to engage said trip element on said carriage, said means to correlate movement adapted to engage and disengage the clutch when said carriage reaches a predetermined position relative to said housing, said apparatus adapted in use to receive curd in the hopper of said housing, force the curd out of said housing into a container mounted on said carriage, and fill the container with cheese.

4. An apparatus for packing cheese comprising, a housing having a tubular portion having an open end and a hopper portion, an auger mounted in said housing, a power means to rotate said auger, a clutch means to selectively control engagement of said power means and said auger, a carriage movable along the longitudinal axis of said tubular portion of said housing, fluid means connected to said carriage to urge said carriage toward said housing with a relatively uniform force, a means to correlate the movement of said carriage and said auger, comprising, a contact means on said carriage, connecting means operatively associated with said clutch and said contact means to selectively disengage and engage said clutch when the carraige is at a predetermined position, said apparatus in use adapted to receive curd in said hopper portion of said housing, force the curd out of said housing into a container mounted on said carriage, and force the curd into said container at a uniform pressure.

5. A method of shaping and packing cheese comprising, (1) cutting cheese curd in a cheese vat into relatively small sized pieces, (2) forcing the pieces of curd through an elongated cylindrical housing out an open end, (3) receiving the curd as it is forced from the open end of housing in a damp cloth bandage slidably disposed over said elongated housing, (4) simultaneously receiving the resultant bandage cheese in a hoop that is approximately six inches in diameter and five feet in length that is telescopingly disposed over said elongated housing, (5) maintaining a constant back pressure against the resultant cheese emerging from said housing with said hoop, (6) pressing the resultant packed cheese in the hoop in a press for approximately one-half hour, (7) cooling the resultant pressed cheese thereby causing same to contract slightly, (8) removing the bandaged cheese from the hoop, (9) removing the cloth bandage from the cheese, (10) cutting the cheese into suitable lengths, and (11) wrapping the resultant lengths of cheese.

6. A method of shaping and packing cheese comprising, (1) cutting curd in a cheese vat into pieces, (2) forcing the pieces of curd through an elongated housing out an open end, (3) receiving the curd as it is forced from the open end of the housing in a bandage slidably disposed over said housing, (4) simultaneously receiving the resultant bandage cheese in a container telescopically disposed over said housing, (5) maintaining a constant back pressure against the cheese emerging from said housing of said container, (6) pressing the resultant cheese in a container, (7) cooling the resultant pressed cheese, (8) removing the bandage cheese from the container, (9) removing the bandage from the cheese, and (10) preparing the cheese into convenient sizes.

References Cited
UNITED STATES PATENTS

| 225,028 | 3/1880 | Straub | 141—257 |
| 749,644 | 1/1904 | Thom | 141—257 X |
| 2,553,684 | 5/1951 | Soulen | 141—257 X |
| 2,813,028 | 11/1957 | Jackson | 99—115 |

LIONEL M. SHAPIRO, *Primary Examiner.*

D. M. NAFF, *Assistant Examiner.*